United States Patent [19]

Yarchi et al.

[11] Patent Number: 5,565,083
[45] Date of Patent: *Oct. 15, 1996

[54] PROCESS AND SCRAPER FOR REMOVING DEPOSITS FROM AN ELECTRODE

[75] Inventors: Yachin Yarchi, Jerusalem; Menachem Givon, Mobile Post HaNegev, both of Israel

[73] Assignee: Electric Fuel (E.F.L.) Ltd., Jerusalem, Israel

[*] Notice: The term of this patent shall not extend beyond the expiration date of Pat. No. 5,378,329.

[21] Appl. No.: 314,764

[22] Filed: Sep. 29, 1994

Related U.S. Application Data

[63] Continuation-in-part of Ser. No. 88,543, Jul. 6, 1993, Pat. No. 5,378,329, which is a continuation-in-part of Ser. No. 636,411, Dec. 31, 1990, Pat. No. 5,228,958.

[51] Int. Cl.⁶ .................................................. C25B 1/16
[52] U.S. Cl. ..................... 205/602; 429/206; 15/236.01; 15/236.07
[58] Field of Search .................................. 204/115, 216, 204/217, 222, 226, 227, 114, 116, 130, 194, 279; 15/236.01, 236.07; 429/17, 19, 21, 49, 204; C25C 7/08

[56] References Cited

U.S. PATENT DOCUMENTS

| | | | |
|---|---|---|---|
| 3,625,806 | 12/1971 | Wennberg | 204/226 |
| 3,847,779 | 11/1974 | Sekine et al. | 204/226 |
| 4,417,953 | 11/1983 | Viellefont et al. | 204/194 |

Primary Examiner—Kathryn Gorgos
Attorney, Agent, or Firm—Helfgott & Karas, P.C.

[57] ABSTRACT

The invention provides a scraper for removing deposits from a major surface of an electrode in an electrochemical bath. The scraper consists of a plate which moves across the electrode surface. The scraper is provided with a scraper blade-retaining slot along one of its edges, the slot being angled relative to the plane of the scraper with its opening extending towards the electrode surface. The scraper also has a scraper blade which is removable from inter-engagement with the slot. In use, the scraper removes deposits from a major surface of an electrode in an electro-chemical liquid-containing bath.

3 Claims, 3 Drawing Sheets

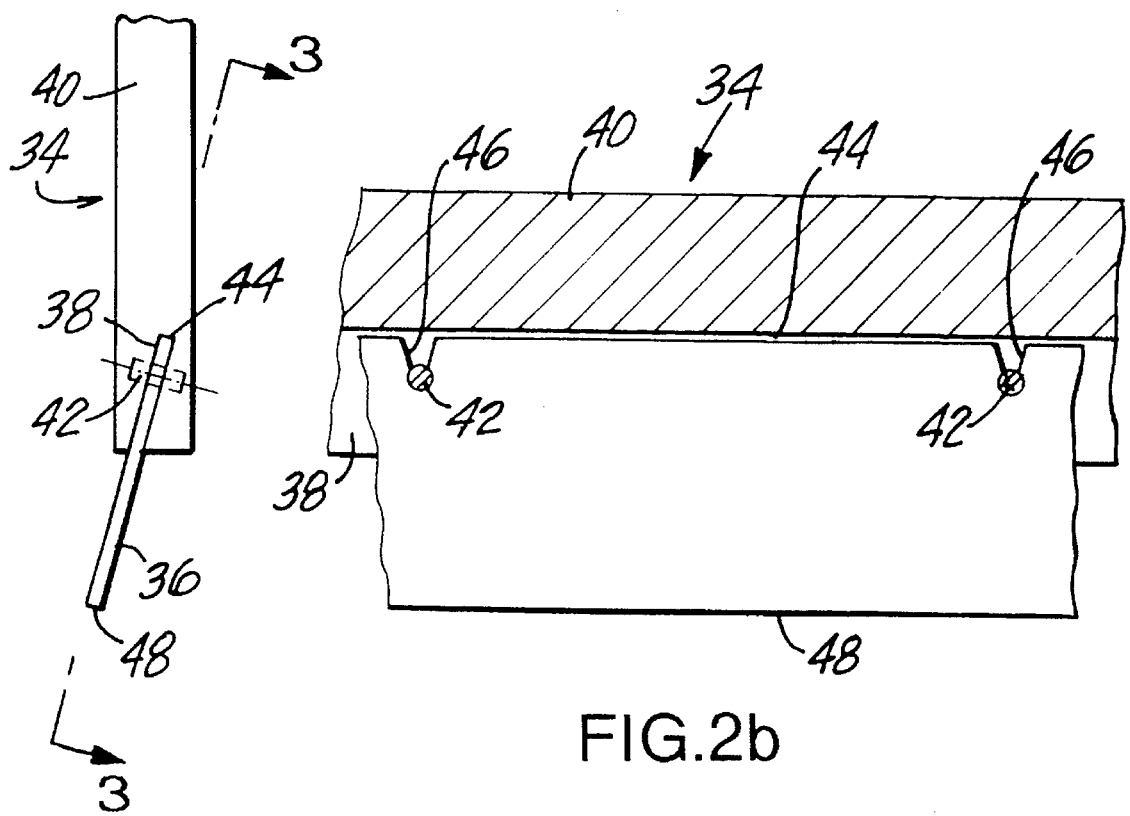
FIG.2b
FIG.2a
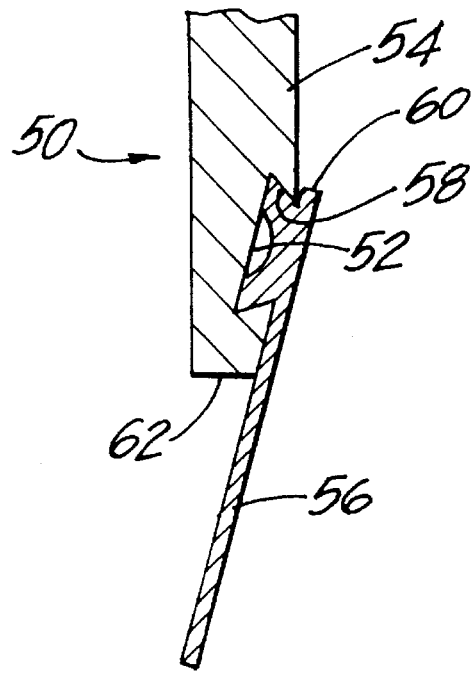
FIG.3

PROCESS AND SCRAPER FOR REMOVING DEPOSITS FROM AN ELECTRODE

The present specification is a continuation in part of U.S. patent application Ser. No. 08/088543, filed Jul. 6, 1993 now U.S. Pat. No. 5,378,329 which, in turn, was a continuation in part Ser. No. 636,411, filed Dec. 31, 1990, of U.S. Pat. No. 5,228,958.

The present invention relates to a process for removing deposits from a major surface of an electrode in an electrochemical bath and to a scraper for use therein.

More particularly, the present invention relates to a process for the preparation and/or regeneration of an alkaline-zinc slurry utilizable in rechargeable zinc batteries, such as zinc-air batteries, and especially to such rechargeable electric batteries intended for use in electric vehicles, which process involves the use of the novel scraper according to the present invention.

BACKGROUND OF THE INVENTION

Various proposals have been made in the past for electric-powered vehicles. To date, for a number of reasons, electric vehicle systems have yet to become generally commercially viable for urban and highway applications. There have been proposals to employ zinc-air batteries for urban vehicle propulsion. An example is the publication "Improved Slurry Zinc-Air Systems as Batteries for Urban Vehicle Propulsion," by P. C. Foller, *Journal of Applied Electrochemistry*, Vol. 16, pp. 527–543 (1986).

Metal-air battery structures are described in the following publications: U.S. Pat. No. 4,842,963, entitled "Zinc Electrode and Rechargeable Zinc-Air Battery;" U.S. Pat. No. 4,147,839, entitled "Electrochemical Cell with Stirred Slurry," U.S. Pat. No. 4,908,281, entitled "Metal-Air Battery with Recirculating Electrolyte;" U.S. Pat. No. 3,847,671, entitled "Hydraulically-Refuelable Metal-Gas Depolarized Battery System;" U.S. Pat. No. 4,925,744, entitled "Primary Aluminum-Air Battery;" U.S. Pat. No. 3,716,413, entitled "Rechargeable Electrochemical Power Supply;" U.S. Pat. No. 4,925,744, entitled "Primary Aluminum-Air Battery."

In U.S. Pat. No. 3,592,698, entitled "Metal Fuel Battery with Fuel Suspended in Electrolyte," there is described inter alia a method for circulating an electrolyte/metal fuel powder mixture through batteries; U.S. Pat. No. 4,126,733, entitled "Electrochemical Generator Comprising an Electrode in the Form of a Suspension" relates to a similar subject, using a circulated suspension of inert cores coated with an electrochemically active material. In U.S. Pat. No. 4,341,847, entitled "Electrochemical Zinc-Oxygen Cell," there is described a method in which an electrolyte is circulated in the annular space between concentric electrodes.

Electrical energy storage systems are described in the following publications: U.S. Pat. No. 4,843,251, entitled "Energy Storage and Supply Battery with Recirculating Electrolyte;" "Energy on Call" by John A. Casazza, et al., *IEEE Spectgrum*, Jun. 1976, pp. 44–47; U.S. Pat. No. 4,275,310, entitled "Peak Power Generation;" U.S. Pat. No. 4,124,805, entitled "Pollution-Free Power Generating and Peak Power Load Shaving System;" U.S. Pat. No. 4,797,566, entitled "Energy Storing Apparatus."

Regeneration of spent zinc-containing alkaline electrolyte is described in a number of prior patents. For example, in U.S. Pat. No. 3,847,671 (mentioned above), whole spent electrolyte is subjected to electrolysis, when zinc deposited at the cathode is removed with a wiper blade. The thus-removed zinc is said to be substantially heavier than the electrolyte (35–40% KOH) and hence falls to the bottom of each cell. In a particular embodiment, the cathode and anode are specified as being made from copper (or silver-plated copper) and carbon, respectively. In U.S. Pat. No. 3,981,747, it is proposed to regenerate the spent zinc in an alkaline electrolyte by reaction with a strongly electropositive metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by mechanically replacing zinc oxide particles by active zinc particles.

Moreover, it is of importance in batteries containing zinc electrodes that the zinc should not be consumed by a reaction with aqueous electrolyte, especially alkaline electrolyte which generates hydrogen gas, which reaction merely corrodes the zinc and prevents its availability for producing electric current. A number of prior patents relate to this problem.

Thus, e.g., in U.S. Pat. No. 4,112,205, double salts containing both mercuric and quaternary ammonium ions are used as inhibitors in galvanic cells comprising zinc anodes, notably in Leclanche-type batteries, containing ammonium chloride/zinc chloride electrolyte; U.S. Pat. No. 3,945,849 employs quaternary ammonium halides as inhibitor for zinc anodes in similar primary cells. U.S. Pat. No. 4,195,120 teaches alkaline cells containing a predominantly zinc anode and, as a hydrogen evolution inhibitor, a surfactant which is an organic phosphate ester of the ethylene oxide adduct type. Metal oxide inhibitors for zinc (in practice ZnO) electrodes are described in U.S. Pat. No. 4,084,047, in which the inhibitors are mixed thoroughly with the ZnO; the inhibitors taught in this patent are binary combinations of oxides which exclude mercuric oxide, the latter being regarded as an ecologically unsatisfactory additive for the ZnO electrode. According to U.S. Pat. No. 4,084,047, it was known to mix or alloy the active zinc in zinc-zinc oxide anodes and their supporting grid (e.g., copper or silver structures) with 0.5–5.0 wt. % mercury or mercuric oxide.

It will also be appreciated by persons skilled in the art that amalgamation of zinc with mercury has been known for a very long time, and that it is carried out in neutral or more usually, in acid solution, e.g., by reacting zinc with mercury chloride in dilute hydrochloric acid.

In U.S. Pat. No. 5,228,958, there is described and claimed a process for the regeneration of an at least partially-spent slurry having a dissolved phase and an undissolved phase for use in metal-air batteries.

In U.S. Pat. No. 5,232,798 there is described and claimed a method for the inhibition of corrosion in particulate zinc.

The disclosures of all of the foregoing publications (including patents), including also the prior art described therein, are explicitly incorporated herein by reference.

It is an object of the present invention to make possible, from a practical point of view, the general commercial viability of zinc-alkaline batteries, more particularly zinc-air batteries, for use in electric vehicle propulsion and energy storage systems. A more specific object of the invention is to provide a process for preparing a zinc slurry for zinc-alkaline cells and/or regenerating a rechargeable slurry for use in zinc-air batteries. Such a slurry would be applicable, for example, in a mechanically refuelable zinc-air battery in which, following discharge, the spent zinc is replaced with regenerated zinc for the subsequent discharge.

One of the major problems which required solution to make said regeneration process commercially feasible is an effective way for removing deposits from a major surface of an electrode in an electrochemical bath.

More particularly, the process described and claimed in co-pending U.S. Ser. No. 08/088,543 inter alia comprises electrolyzing an admixture containing zinc, which has been at least partly oxidized, to an oxidation product selected from the group consisting of zinc oxide, zinc hydroxide and zincates in a cell with a corrosion-resistant anode and a non-zinc-adherent cathode such that the zinc which deposits on said cathode self-detaches or is removable by a method selected from brushing, scraping, vibrating, the use of liquid jets, either fixed or moving, and the use of electrical pulsing, until no more than a pre-selected amount of zinc remain in the solution. However, the method described in said application was that the cathode was transferred to a separate container every ten minutes, where the deposited zinc was removed by scraping with a plastic spatula and homogenized into a particulate structure by means of a revolving nylon brush, while a clean cathode was placed in the electrolytic bath to continue the zinc recovery process.

While such a method indeed works, it is not practical for mass regeneration of thousands of anodes for the cells of electric fuel batteries.

As mentioned hereinbefore, U.S. Pat. No. 3,847,671 relates to a hydraulically refuelable metal-gas depolarized battery system which inter alia purports to teach an electrode arrangement as described in column 9, lines 25–32 as follows:

Wipers 66 extend the height of each electrode and are wiped across the face of each negative electrode to remove the spongy zinc deposit therefrom as fast as it forms, thereby making room for more deposit without filing the cell. The dislodged powder is removed from the bottom of each cell periodically to a manifold (not shown), from which it is pumped into slurry tank 48.

An examination of FIG. 5 of said patent reveals that wipers 66 are in fact vertical triangular prisms, with one apex serving to move horizontally back and forth across the electrode surface.

The problem with such a configuration, however, is that it has now been found that the wedge shape of the prism directs liquid in said bath towards the line of contact between the scraper and the electrode, whereby the resulting hydrodynamic forces work against an effective scraping contact and action.

SUMMARY OF THE INVENTION

With this state of the art in mind, there is now provided, according to the present invention, a process for removing deposits from a major surface of an electrode in an electrochemical liquid-containing bath, comprising periodically moving a scraper along said major surface of said electrode, said scraper comprising a plate attached to actuating means for affecting relative movement between said plate and said major surface of said electrode, said plate being provided with a scraper blade-retaining slot along one of its edges, said slot being angled relative to the plane of said plate with its opening extending towards said electrode surface and said scraper further comprising a scraper blade provided with means for removable inter-engagement with said slot.

It is to be noted that it is possible to make the scraper plate and scraper blade in one piece. However, there are economic advantages in making the plate out of a rigid but low-cost plastic, such as polypropylene while the blade is made of an abrasion-resistant but more expensive material such as polysulfone.

When, as in the present invention, the scraper plate and blade are made separately and then assembled, very little space can be allocated for attachment hardware, such as fasteners. The scraper must operate in the narrow space available between the anode and the cathode. Such space is narrow due to design considerations such as reducing electrical losses during electrowinning. The present invention provides several solutions to this problem.

In preferred embodiments of the present invention, said blade is moved from a first position to a second position by said actuating means in a first forward stroke, which affects the scraping of said electrode and in which said blade is further urged towards said surface by hydrodynamic forces exerted by said liquid in said bath and is returned from said second position to said first position by said actuating means in a second return stroke in which said blade is urged away from said surface by hydrodynamic forces exerted by said liquid in said bath.

The invention also provides a scraper for removing deposits from a major surface of an electrode in an electrochemical bath, comprising a plate attached to actuating means for affecting relative movement between said plate and said major surface of said electrode, said plate being provided with a scraper blade-retaining slot along one of its edges, said slot being angled relative to the plane of said plate with its opening extending towards said electrode surface and further comprising a scraper blade provided with means for removable inter-engagement with said slot.

In a first preferred embodiment of the present invention, said slot is provided with a plurality of spaced-apart pins extending between interfacing inner walls of said slot and said scraper blade comprises a first edge provided with a plurality of spaced-apart keyhole slots, sized and spaced to override said pins when said edge is inserted in said slot, and having an opposing second edge for scraping deposits from said electrode.

Preferably, each plate is made of an inexpensive plastic suitable for use in a KOH solution at temperatures up to 90° C., such as polypropylene or a fluoroplastic. The plate has large through-going apertures to allow ionic conductivity between the anode and the cathode.

The blade is made of a plastic with high mechanical strength, such as polysulfone.

With regard to the angle between the plate and the blade, if this is too large, too little shear force is applied to the zinc particles which are to be removed. On the other hand, too small an angle will require a blade that is too long and weak. In the present invention, this angle is between 7° and 25°.

In an especially preferred embodiment of the present invention, there is provided a process for the preparation of an alkaline-zinc slurry for use in batteries; said slurry comprising an admixture of zinc which has been at least partly oxidized to an oxidation product selected from the group consisting of zinc oxide, zinc hydroxide and zincates; an aqueous solution consisting essentially of potassium hydroxide and potassium zincate; and an inorganic or organic inhibitor, effective to inhibit the interaction of zinc and potassium hydroxide in aqueous solution, which would otherwise result in the evolution of hydrogen gas; said process comprising the steps of electrolyzing said admixture in a cell with a corrosion-resistant anode and a non-zinc-adherent cathode such that the zinc which deposits on said cathode is removable by scraping until no more than a preselected amount of zinc remains in the solution, provided that the current density at the cathode is preselected so that in conjunction with the non-zinc-adherent characteristic of the cathode, the electrowon zinc will have, after homogenizing into particles, a density within the range of 0.2–2.0 g/cc and a surface area within the range of 0.5–6.0 m$^2$/g; removing zinc from the cathode utilizing a scraper comprising a plate attached to actuating means for affecting relative movement between said plate and said major surface of said electrode, said plate being provided with a scraper blade-retaining slot along one of its edges, said slot being angled relative to the plane of said plate with its opening extending towards said electrode surface and said scraper further comprising a scraper blade provided with means for removable inter-engagement with said slot, for scraping deposited zinc from said cathode; collecting and homogenizing said scraped zinc into particles; combining said homogenized zinc particles with additional aqueous potassium hydroxide and optionally with other makeup components selected from the group consisting of water and inhibitor to form a charged slurry; optionally analyzing said charged slurry in order to ascertain whether at least the concentration values of zinc, the potassium hydroxide and the inhibitor lie within preset limits; and optionally adjusting the concentration values of at least one of said aforementioned zinc, potassium hydroxide or inhibitor to within preset limits for said charged slurry.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

IN THE DRAWINGS:

FIG. 2a is a detail end-view of a second embodiment;

FIG. 2b is a sectional view taken along AA of FIG. 2a;

FIG. 3 is a fragmented sectional view of a third embodiment;

Figure 1:
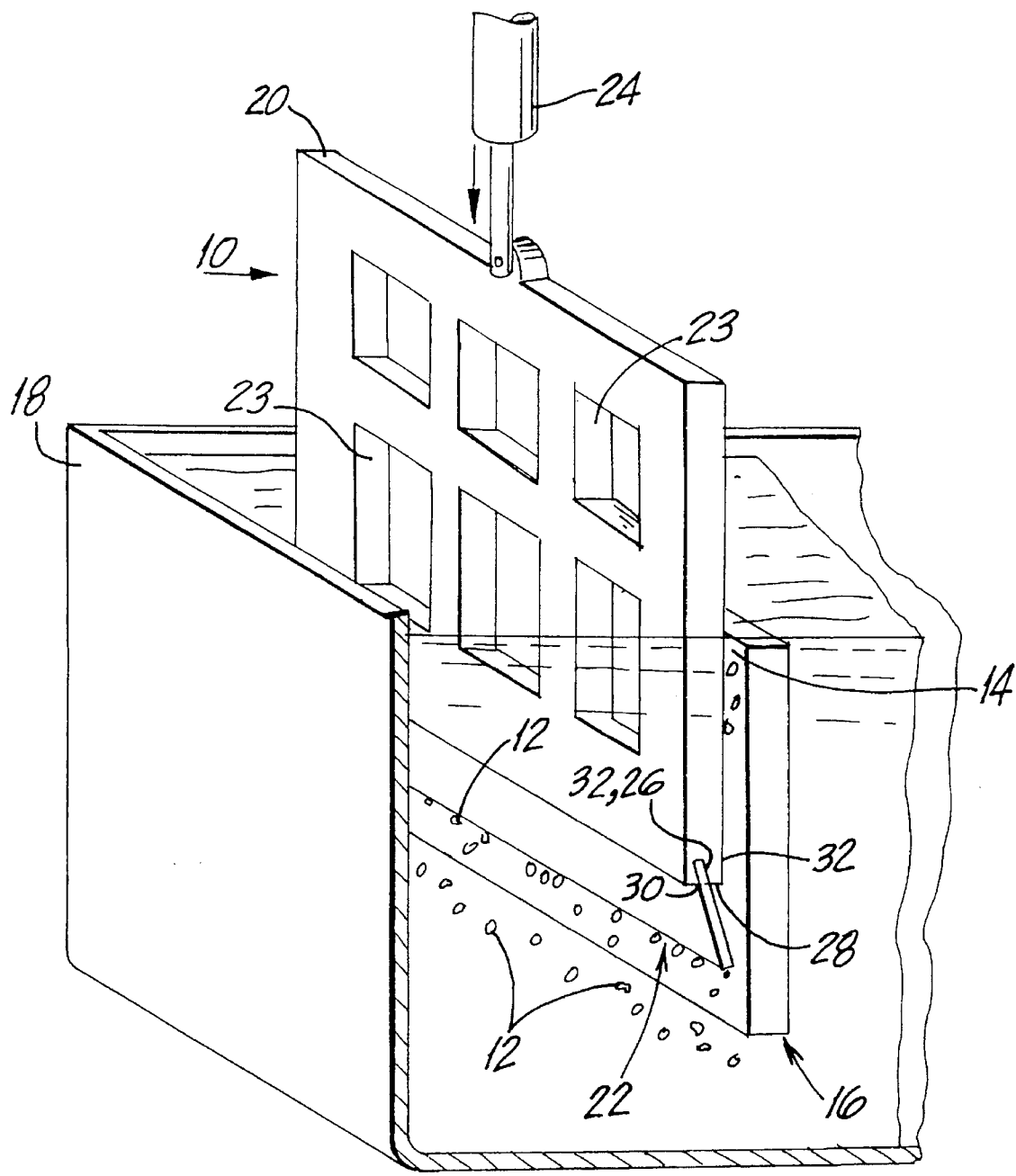
FIG. 1 is a perspective view of a preferred embodiment of the scraper, an electrochemical liquid containing tank or bath being sectioned, according to the invention.

There is seen in FIG. 1 a scraper 10 for removing deposits 12 from a major surface 14 of an electrode 16 in the liquid 19 in an electrochemical bath 18. For simplicity the drawing shows a single electrode 16, for example a cathode and scraper 10. In a practical arrangement, large numbers of electrodes 16 are scraped in parallel formation, and facing each electrode 16 is a counter-electrode of opposite polarity, and there is a scraper on each side of the cathode.

The scraper 10 comprises a plate 20 and an attached scraper blade 22.

Suitably the plate 20 may be made of polypropylene, which material has outstanding chemical resistance. It is, however, advantageous that the plate 20 be rigid, which can be achieved by using a plate 5–10 mm thick, or by using a ribbed plate.

Plate rigidity can also be achieved by using a nylon-covered steel. The plate 20 is attached to actuating means 24 for affecting relative movement between itself and the electrode 16.

The scraper plate 20 is advantageously provided with apertures 23 allowing ionic conductivity between adjacent electrodes of opposite polarity.

Actuating means 24 may comprise reciprocating pneumatic or hydraulic cylinders or a crank drive obtained from a slowly revolving shaft to drive the scrapers 10 in a vertical plane. In a further embodiment (not shown) the scrapers 10 are clamped and the electrochemical liquid-containing tank 18 is driven to reciprocate in a vertical plane. All actuating means 24 mentioned are well known and require no elaboration.

The plate 20 is provided with a scraper blade-retaining slot 26 along one of the plate edges 28. The slot 26 is angled relative to the plane of the plate 20. The slot opening 30 extends towards the electrode surface 14.

The scraper blade 22 is provided with means 32 for removable inter-engagement with the slot 26. In this embodiment, means 32 comprise a roughened surface on the major surfaces of the scraper blade 22, which is then held by friction in the tight-fitting slot 26.

The blade 22 is best made flexible so as to adapt itself to any irregularities in the surface 14 with which it is in contact. It has been found that a blade 22 of thickness between about 0.7 and 1 mm operates very satisfactorily.

With regard to selecting a suitable material for the blade 22, metals are unsuitable as there is the danger of causing a short circuit in the electrochemical liquid-containing tank 18; they are also likely to receive an unwanted coating of zinc. Nevertheless, an abrasion-resistant material is required for satisfactory scraping performance. It has been found that a well-operating blade 22 may be made of polysulfone. This is a strong polymer which can also operate at elevated temperatures while retaining its dimensional stability.

Referring now to FIGS. 2a and 2b, there are seen details of a scraper 34 which is similar to the scraper 10. However, the method of retaining the blade 36 in the blade-retaining slot 38 of the plate 40 is different. There are provided a plurality of spaced-apart pins 42 extending between interfacing inner walls of the slot 38. The scraper blade 36 comprises a first edge 44 provided with a plurality of spaced-apart keyhole-shaped slots 46, sized and spaced to override the pins 42 when the edge 44 is inserted in the slot 38. The blade 36 has an opposing second edge 48 for scraping deposits 12 from the electrode 16. In comparison with the scraper blade 22 of FIG. 1, the blade 36 is held more securely.

The blade 36 may conveniently be assembled to the plate 40 by temporarily bending the blade 36 in a direction, causing opening of the keyhole-shaped slots 46. On the release of the blade 36 in contact with the pins 42, the slots 46 reassume their original dimensions to firmly hold the blade 36.

FIG. 3 shows a scraper 50, similar to the scraper 10, though with a different retention means. The blade-retention slot 52 provided in the plate 54 has a female dovetail shape. The scraper blade 56 is provided with a matching male dovetail 58 near its first edge 60. The scraper blade 56 is further stabilized by contact with the lower edge 62 of the plate 54. The blade 56 is oriented at an angle of between 7° and 25° from the plane of the plate 54.

The present invention also provides for two processes.

PROCESS A

In the following description, reference is again made to FIG. 1. A process for removing deposits 12 from a major surface 14 of an electrode 16 in an electrochemical liquid-containing tank 18. The process comprises periodically moving a scraper 10 along a major surface 14 of an electrode 16. The scraper 10 has been fully described with reference to FIG. 1.

In a second embodiment of this process, the electrode 16 is a cathode, separated from an anode (not shown) by a distance of between 5 to 15 mm. The scraper 10 is built to have a total thickness of slightly less than this distance and operates satisfactorily in this confined volume.

In a third embodiment of this process the electrode 16 is a non-zinc adherent cathode, and the deposits 12 are metal deposits of zinc.

Figures 4, 5:
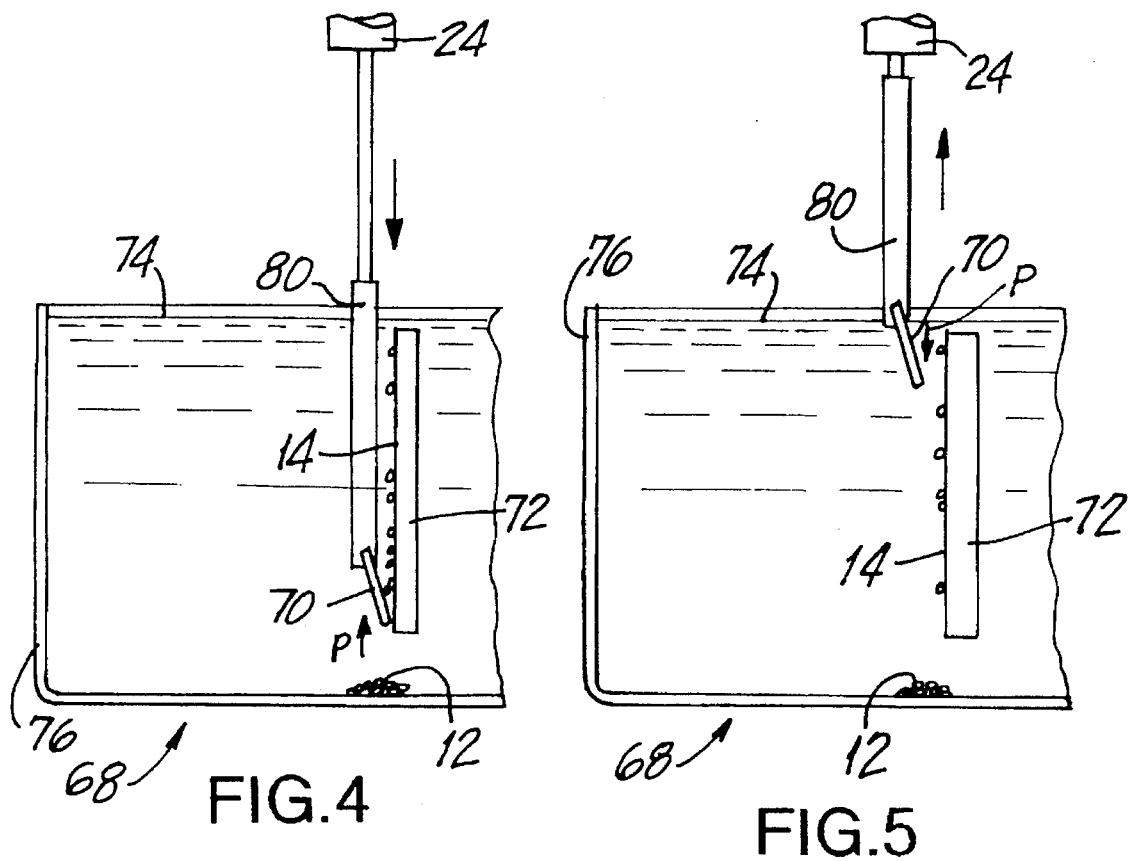
FIG. 4 and 5 are end views of an embodiment using hydrodynamic forces to contact and separate the scraper blade and the electrode.

Referring now to FIGS. 4 and 5, there is seen an apparatus 68 similar to that seen in FIG. 1.

In a fourth embodiment of the process a blade 70 is moved from a first position, as seen in FIG. 5, to a second position, as seen in FIG. 4, by actuating means 24 in a first stroke to affect scraping of the electrode 72. The blade 70 is further urged towards the electrode surface 14 by hydrodynamic forces exerted by liquid 74 in the electrochemical liquid-containing tank 76. The blade 70 is returned from the second position to the first position by the actuating means 24, connected to a plate 80, in a return stroke in which the blade 70 is urged away from the surface 14 by hydrodynamic forces, shown by arrows P, exerted by said liquid 74 in the electrochemical liquid-containing tank 76, as seen in FIG. 5.

Scraping is thus carried out without the need for the provision of means to press the scraper blade 70 against the surface 14. Furthermore, on the return stroke when no scraping is carried out, unnecessary abrasion of the blade 70 is automatically prevented as the hydrodynamic forces cause separation of the blade 70 from the surface 14.

PROCESS B

A process for the preparation of an alkaline zinc slurry for use in batteries.

The slurry comprises an admixture of:

a) zinc which has been partly oxidized to an oxidation product selected from the group consisting of zinc oxide, zinc hydroxide and zincates;

b) an aqueous solution consisting essentially of potassium hydroxide and potassium zincate; and c) an inhibitor, effective to inhibit the interaction of zinc and potassium hydroxide in aqueous solution, which would otherwise result in the evolution of hydrogen.

The process comprises the following steps:

a) Electrolyzing said admixture in a cell with a corrosion-resistant anode and a non-zinc-adherent cathode, such that the zinc which deposits on said cathode is removable by scraping until no more than a preselected amount of zinc remains in said aqueous solution, provided that the current density at the cathode is preselected so that in conjunction with the non-zinc-adherent characteristic of the cathode, the electro-won zinc will have, after homogenizing into particles, a density within the range of 0.2 to 2.0 g/cc and a surface area within the range 0.5 to 6.0 $m^2$/g.

b) Removing zinc from the cathode utilizing a scraper 10, which has been fully described with reference to FIG. 1.

c) Collecting and homogenizing said scraped zinc into particles.

d) Combining said particles with additional aqueous potassium hydroxide and optionally with other make-up components selected from the group consisting of water and inhibitor, to form a charged slurry.

e) Optionally analyzing said charged slurry in order to ascertain whether at least the concentration values of zinc, the potassium hydroxide and the inhibitor lie within present limits.

f) Optionally adjusting the concentration values of at least one of said aforementioned zinc, potassium hydroxide or inhibitor to within present limits of said charged slurry.

Figure 6:
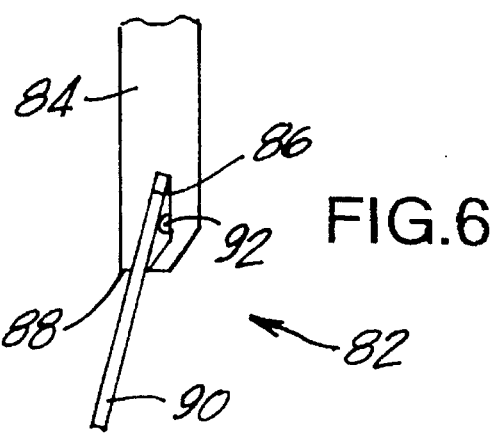
FIG. 6 is a fragmented end view of a fourth embodiment.

FIG. 6 depicts a fourth embodiment of a scraper 82. The scraper plate 84 is provided with an angled blade-retaining slot 86 along a lower edge 88 of the plate 84. The slot 86 provides accommodation for the scraper blade 90 and also for a locking element 92 inserting along the length of the slot 86 and being in frictional contact with the blade 90 and the slot 86. An example of a suitable locking element 92 is a high-strength nylon cord of the type used in fishing reels.

It will be evident to those skilled in the art that the invention is not limited to the details of the foregoing illustrative embodiments, and that the present invention may be embodied in other specific forms without departing from the essential attributes thereof, and it is, therefore, desired that the present embodiments be considered in all respects as illustrative and not restrictive, reference being made to the appended claims, rather than to the foregoing description, and all changes which come within the meaning and range of equivalency of the claims, are therefore, intended to be embraced therein.

What is claimed is:

1. A process for removing deposits from a major surface of an electrode in an electrochemical liquid-containing bath, comprising periodically moving a scraper along said major surface of said electrode, said scraper comprising a plate attached to actuating means for affecting relative movement between said plate and said electrode, said plate being provided with a scraper blade-retaining slot along one of edges thereof, said slot being angled relative to the plane of said plate with an opening thereof extending towards said surface of said electrode and said scraper further comprising a scraper blade provided with means for removable inter-engagement with said slot, wherein said process is used for the preparation of an alkaline-zinc slurry for use in batteries, said slurry comprising an admixture of:

a) zinc which has been at least partly oxidized to an oxidation product selected from the group consisting of zinc oxide, zinc hydroxide and zincates;

b) an aqueous solution consisting essentially of potassium hydroxide and potassium zincate; and c) an inhibitor, effective to inhibit the interaction of zinc and potassium hydroxide in the aqueous solution, which would otherwise result in evolution of hydrogen gas;

said process used for the preparation of an alkaline-zinc slurry comprising the steps of:

a) electrolyzing said admixture in a cell with a corrosion-resistant anode and a non-zinc-adherent cathode, such that the zinc which deposits on said cathode is removable by scraping until no more than a preselected amount of zinc remains in said aqueous solution, provided that the current density at the cathode is preselected so that in conjunction with the non-zinc-adherent characteristic of the cathode, the electro-won zinc will have, after homogenizing into particles, a density within the range of 0.2–2.0 g/cc and a surface area within the range of 0.5–6.0 $m^2/g$;

b) removing zinc from the cathode utilizing said scraper comprising said plate attached to said actuating means for affecting relative movement between said plate and said cathode, said plate being provided with scraper blade-retaining slot along one of edges thereof, said slot being angled relative to the plane of said plate with the opening thereof extending towards a surface of said cathode and said scraper blade provided with means for removable iner-engagement with said slot scraping deposited zinc from said cathode;

c) collecting and homogenizing said scraped zinc into particles;

d) combining said particles with additional aqueous potassium hydroxide and optionally with other make-up components selected from the group consisting of water and inhibitor, to form a charged slurry;

e) optionally analyzing said charged slurry to ascertain whether at least the concentration values of zinc, the potassium hydroxide and the inhibitor lie within preset limits; and f) optionally adjusting the concentration values of at least one of said zinc, potassium hydroxide or inhibitor to within preset limits for said charged slurry.

2. A process for removing deposits from a major surface of an electrode in an electrode in an electrochemical liquid-containing bath, comprising periodically moving a scraper said major surface said electrode, said scraper comprising a plate attached to actuating means for affecting relative movement between said plate and said electrode, said plate being provided with a scraper blade-retaining slot along one of edges thereof, said slot being angled relative to the plane of said plate with and opening thereof extending towards said surface of said electrode and said scraper further comprising a scraper blade provided with means for removable inter-engagement with said slot, wherein said blade is moved from a first position to a second position by said actuating means in a first stroke to affect scraping of said electrode, and in which said blade is further urged towards said surface of said electrode by hydrodynamic forces exerted by said liquid in said bath and is returned from said second position to said first position by said actuating means in a return stroke in which said blade is urged away from said surface by hydrodynamic forces exerted by said liquid in said bath.

3. A process according to claim 2, wherein said first stroke is a downward stroke and said second stroke is an upward stroke.

* * * * *